(12) United States Patent
Lowe et al.

(10) Patent No.: US 7,323,921 B2
(45) Date of Patent: Jan. 29, 2008

(54) CLOCK GENERATOR, SYSTEM ON A CHIP INTEGRATED CIRCUIT AND METHODS FOR USE THEREWITH

(75) Inventors: Erich Lowe, Austin, TX (US); Michael R. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 11/287,550

(22) Filed: Nov. 22, 2005

(65) Prior Publication Data

US 2007/0115039 A1    May 24, 2007

(51) Int. Cl.
*G06F 1/04* (2006.01)
(52) U.S. Cl. ..................... 327/291; 327/295
(58) Field of Classification Search .......... None
See application file for complete search history.

(56) References Cited

U.S. PATENT DOCUMENTS

| | | | | |
|---|---|---|---|---|
| 4,494,021 A | * | 1/1985 | Bell et al. ............... | 327/262 |
| 4,790,320 A | * | 12/1988 | Perten et al. ............ | 600/447 |
| 5,745,394 A | * | 4/1998 | Tani ........................ | 708/313 |
| 5,959,563 A | * | 9/1999 | Ring ........................ | 341/155 |
| 6,125,077 A | * | 9/2000 | Robinson et al. ......... | 365/233 |
| 6,229,367 B1 | * | 5/2001 | Choudhury .............. | 327/276 |
| 6,407,606 B1 | * | 6/2002 | Miura ...................... | 327/241 |
| 6,525,585 B1 | * | 2/2003 | Iida et al. ................ | 327/279 |
| 6,771,103 B2 | * | 8/2004 | Watanabe et al. ......... | 327/161 |
| 6,794,912 B2 | * | 9/2004 | Hirata et al. ............. | 327/158 |
| 6,943,610 B2 | * | 9/2005 | Saint-Laurent ........... | 327/295 |

* cited by examiner

*Primary Examiner*—Cassandra Cox
(74) *Attorney, Agent, or Firm*—Garlick Harrison & Markison; Bruce E. Stuckman (57) ABSTRACT

A system on a chip integrated circuit includes a first circuit module and N other circuit modules that are operable to produce at least one output signal based on at least one input signal. A reference oscillator for generating a base clock signal for the first circuit module. A clock delay generator generates N delayed clock signals at a corresponding N clock delays, wherein N is greater than or equal to 2. The N delayed clock signals are provided to the N other circuit modules.

23 Claims, 11 Drawing Sheets

CLOCK GENERATOR, SYSTEM ON A CHIP INTEGRATED CIRCUIT AND METHODS FOR USE THEREWITH

CROSS REFERENCE TO RELATED PATENTS

The present application is related to the following U.S. patent applications that are commonly assigned:

Receiver and methods for use therewith, having Ser. No. 11/237,339, filed on Sep. 28, 2005;

Mixing module and methods for use therewith, having Ser. No. 11/237,344, filed on Sep. 28, 2005;

Controllable phase locked loop and method for producing an output oscillation for use therewith, having Ser. No. 11/126,553, filed on May 11, 2005;

Controllable phase locked loop via adjustable delay and method for producing an output oscillation for use therewith, having Ser. No. 11/153,144, filed on Jun. 15, 2005;

Programmable sample rate analog to digital converter and method for use therewith, having Ser. No. 11/152,910, filed on Jun. 15, 2005;

Radio receiver, system on a chip integrated circuit and methods for use therewith, having Ser. No. 11/287,551, filed on Nov. 22, 2005; the contents of which are expressly incorporated herein in their entirety by reference thereto.

TECHNICAL FIELD OF THE INVENTION

The present invention relates to clock generators used in devices such as system on a chip integrated circuits and related methods.

DESCRIPTION OF RELATED ART

As is known, integrated circuits are used in a wide variety of electronic equipment, including portable, or handheld, devices. Such handheld devices include personal digital assistants (PDA), CD players, MP3 players, DVD players, AM/FM radios, a pager, cellular telephones, computer memory extension (commonly referred to as a thumb drive), etc. Each of these handheld devices includes one or more integrated circuits to provide the functionality of the device. As an example, a handheld FM radio receiver may include multiple integrated circuits to support the reception and processing of broadcast radio signals in order to produce an audio output that is delivered to the user through speakers, headphones or the like. Many such integrated circuits include a processing device that executes a program that includes a sequence of instructions that are stored in a memory device.

One concern in the design of these circuits is the amount of noise that is produced. It is desirable for the noise of these circuits to be as low as possible. Digital circuit designs can reduce the amount of analog noise, such as thermal noise that is introduced. However, other sources of degradation are introduced by digital circuits. For example, clock tones and their harmonics can generate undesired spurs in the signal band thereby degrading analog performance.

The need exists for integrated circuits that can be implemented efficiently and that have reduced amounts of errors caused by digital circuits.

DETAILED DESCRIPTION OF THE INVENTION INCLUDING THE PRESENTLY PREFERRED EMBODIMENTS

The embodiments of the present invention yield several advantages over the prior art. In an embodiment of the present invention, clock signals to multiple circuit modules are staggered to produce a more constant current from the power supply. In a further embodiment of the present invention, design methods are employed that distribute the computations of a circuit module over a greater period to reduce transient current draw and therefore power supply voltage disturbance caused by (digital switching activity of such circuit modules) turning a circuit module on and off. In particular, these and other advantages will be evident to one of ordinary skill of the art, based on the teachings presented herein.

Figure 1:
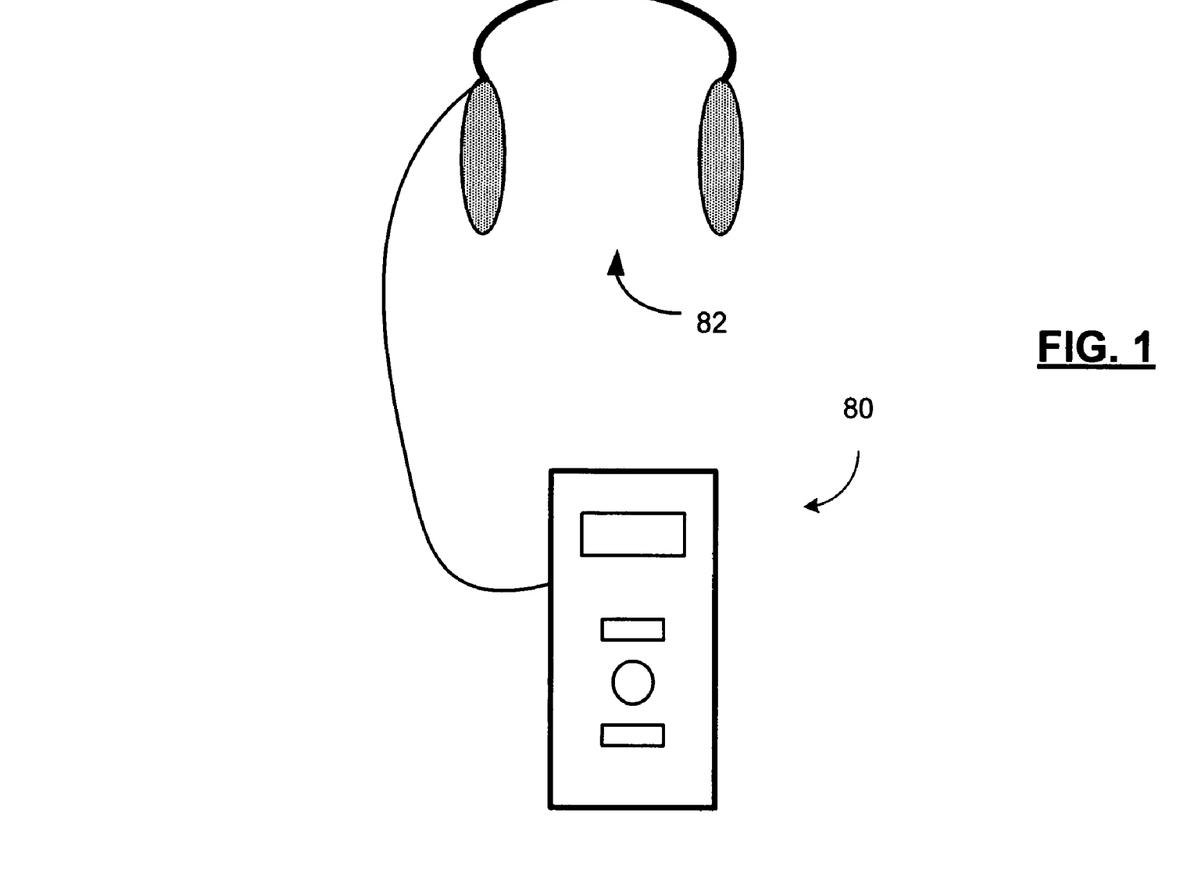
FIG. 1 presents a pictorial diagram of a handheld audio system in accordance with an embodiment of the present invention.

FIG. 1 presents a pictorial diagram of a handheld audio system in accordance with an embodiment of the present invention. In particular, a handheld audio system 80 is shown that receives a radio signal that carries at least one composite audio channel that includes right and left channel stereo audio signals. In operation, the handheld audio system 80 produces an audio output for a user by means of headphones 82 or other speaker systems. In an embodiment of the present invention, the radio signal includes one or more of a broadcast frequency modulated (FM) radio signal, an in-band on-channel (IBOC) digital radio signal, a Bluetooth signal, a broadcast amplitude modulated (AM) radio signal, a broadcast satellite radio signal, and a broadcast cable signal. In addition to producing an audio output from the received radio signal, the handheld audio system 80 can optionally process stored MP3 files, stored WMA files, and/or other stored digital audio files to produce an audio output for the user. The handheld audio system may also include video features as well. Handheld audio system 80 includes one or more integrated circuits (ICs) that implement the features and functions in accordance with one or more embodiments of the present invention that are discussed herein.

Figure 2:
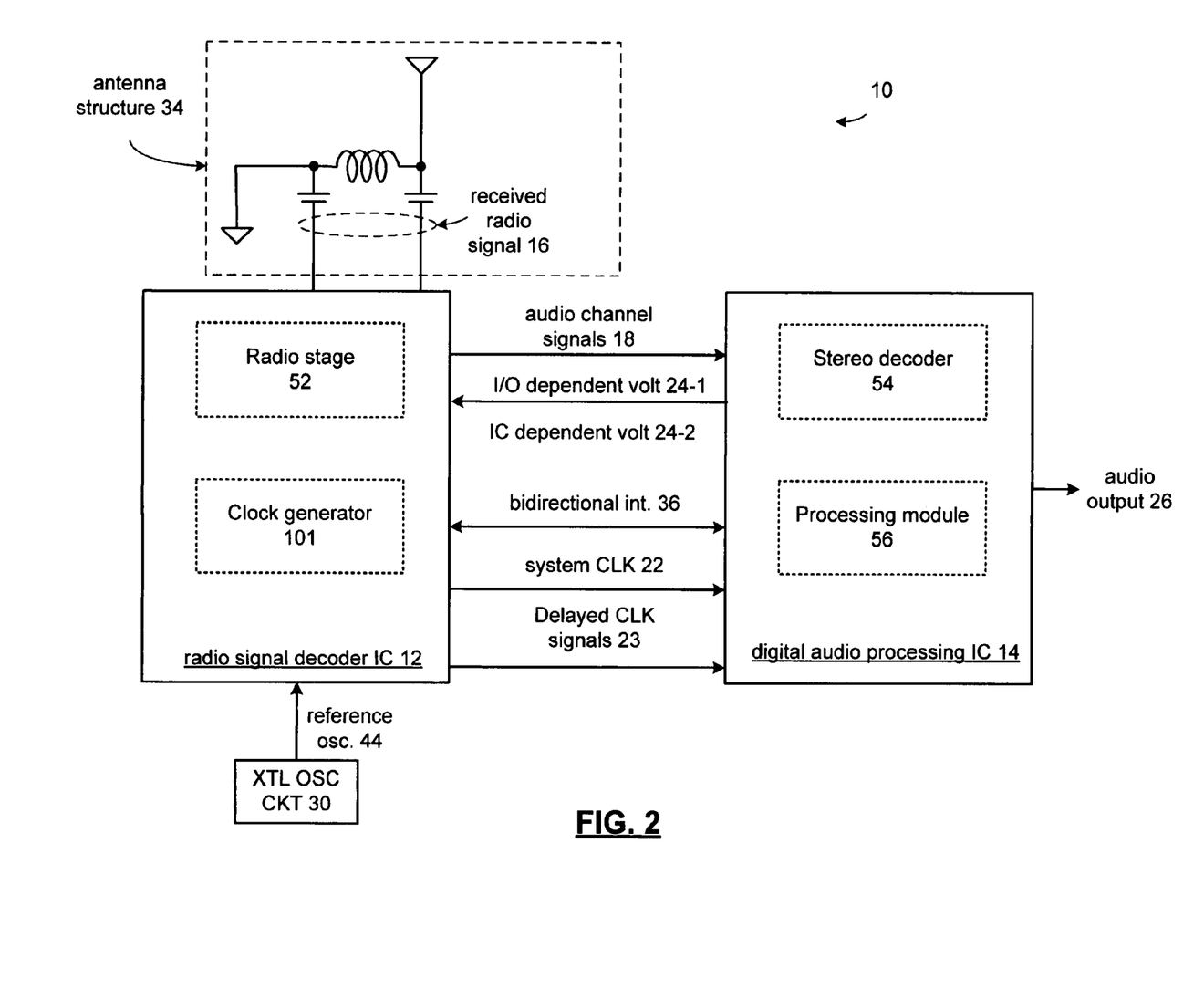
FIG. 2 presents a schematic block diagram of a handheld audio system in accordance with an embodiment of the present invention.

FIG. 2 presents a schematic block diagram of a handheld audio system in accordance with an embodiment of the present invention. In particular, a schematic block diagram of a handheld audio system 10 is presented that includes a radio signal decoder integrated circuit 12 and a digital audio processing integrated circuit 14. The digital audio processing integrated circuit 14 includes memory, and a DC-to-DC converter. The digital audio processing integrated circuit 14 further includes a processing module 56 that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In this embodiment, the radio signal decoder integrated circuit 12 is operably coupled to a crystal oscillator circuit 30 and an antenna structure 34. The crystal oscillation circuit 30 is operably coupled to a crystal and produces therefrom a reference oscillation 44. The antenna structure 34 includes an antenna, a plurality of capacitors and an inductor coupled as shown. The received radio signal 16, which may be an AM radio signal, FM radio signal, (IBOC) digital radio signal, a Bluetooth signal, satellite radio signal, cable radio signal, is provided from the antenna structure 34 to the radio signal decoder integrated circuit 12.

The radio signal decoder integrated circuit 12 includes a radio stage 52 that performs the function of radio signal decoding. Radio stage 52 converts the received radio signal 16, into two audio channel signals 18 (e.g., a stereo signal), which include two composite audio signals that represent a Left+Right signal and a Left−Right signal. The radio signal decoder IC 12 provides the two audio channel signals 18 to the digital audio processing IC 14. Note that the two audio channel signals 18 may be digital signals or analog signals.

In an embodiment of the present invention, the digital audio processing integrated circuit 14, via a DC-DC converter, generates an input/output (I/O) dependent supply voltage 24-1 and an integrated circuit (IC) dependent voltage 24-2 that are supplied to the radio signal decoder IC 12. In one embodiment, the I/O dependent voltage 24-1 is dependent on the supply voltage required for input/output interfacing of the radio signal decoder IC and/or the digital audio processing IC 14 (e.g., 3.3 volts) and the IC dependent voltage 24-2 is dependent on the IC process technology used to produce integrated circuits 12 and 14. In alternative embodiments, other structures and methods for supplying power to and from integrated circuits 12 and 14 may be employed within the broad scope of the present invention.

The digital audio processing integrated circuit 14 further includes a stereo decoder 54 that receives the two audio channel signals 18, digitally filters these two signals, and produces therefrom audio output 26. The digital audio processing IC 14 may provide the audio output 26 to a headphone set or other type of speaker output. As an alternative to producing the audio output 26 from the two audio channel signals 18, the digital audio processing integrated circuit 14 may process stored MP3 files, stored WMA files, and/or other stored digital audio files to produce the audio output 26.

The interface between the integrated circuits 12 and 14 further includes a bi-directional interface 36. Such an interface may be a serial interface for the integrated circuits 12 and 14 to exchange control data and/or other type of data. In one embodiment, the bi-directional interface 36 can include one or more serial communication paths.

In an embodiment of the present invention, radio signal decoder IC 12 and digital audio processing IC 14 each contain a plurality of circuit modules that process one or more signals in response to a clock signal, and that are operable to perform at least some of the functions of radio signal decoder IC 12 and digital audio processing IC 14 such as the processing of at least one input signal into at least one output signal. Examples of such circuit modules can include mixing modules, phase locked loops, frequency synthesizers, signal encoders and decoders, signal compression and decompression modules, analog to digital converters, digital to analog converters, signal generators, input and output processing modules, speech synthesis modules, text-to-speech conversion modules, speech recognition modules, audio playback units, digital filters, downsampling modules, switched capacitor circuits, digital sampling modules, and other circuit modules used in the processing of digital, analog, discrete time and mixed signal circuits.

Radio signal decoder IC 12 further includes a clock generator 101, coupled to the a reference oscillation 44 for generating a base clock signal such as system clock (CLK) 22 and for generating N delayed clock signals 23 at a corresponding N clock delays, wherein N is greater than or equal to 2. In an embodiment of the present invention, system clock 22 and delayed clock signals are used by one or more circuit modules of radio signal decoder IC 12 and are further sent to digital audio processing IC 14 to provide clock signals to one or more circuit modules of digital audio processing IC.

Many system on a chip integrated circuits include one or more circuit modules that are especially susceptible to noise that occurs within certain frequency bands, such as the frequency bands of the circuit that are occupied by desirable signals. For instance, a super heterodyne radio receiver may be susceptible to noise and spurs that occur within the circuit that can bleed through to the passband of the radio frequency (RF) input or the intermediate frequency (IF) filter. The effective noise in an integrated circuit can be reduced by reducing the amount of noise that occurs within these frequency bands. While the production of a certain amount of noise in a circuit can be inevitable, the placement of the noise signals, including spurs and harmonics, at frequencies that are outside the frequency bands occupied by desirable signals, can improve the overall performance of a circuit.

Noise transients are frequently produced by the rising and falling edges of clock signals due to parasitic inductance and capacitance present in circuit implementations creating second order or higher underdamped response. The use of a common clock signal over multiple circuit modules can create a potential additive effect caused by the simultaneous or near simultaneous generation of noise transients at multiple points in a circuit. Providing the use of multiple delayed versions of the base clock signal reduces this additive effect and spreads the noise transients over time and over frequencies that are higher than the clock frequency.

Further functions and features of the invention will be discussed in the Figures that follow.

Figure 3:
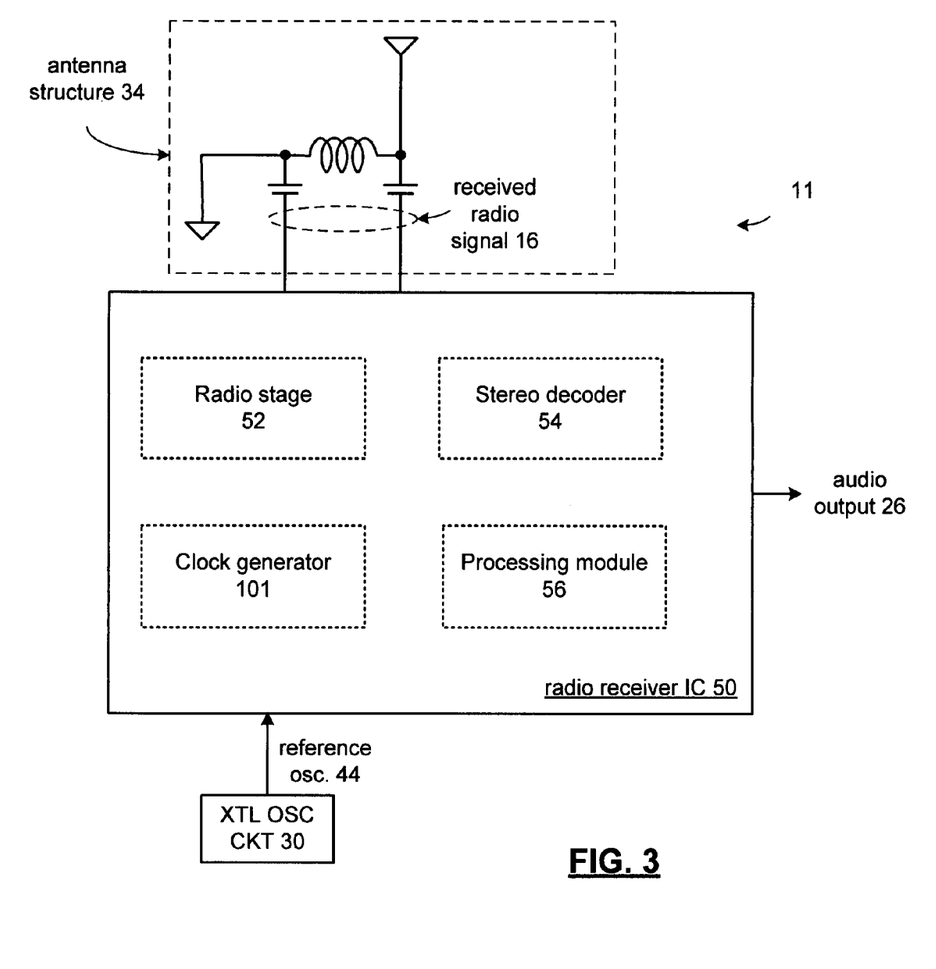
FIG. 3 presents a schematic block diagram of a handheld audio system in accordance with an alternative embodiment of the present invention.

FIG. 3 presents a schematic block diagram of a handheld audio system in accordance with an alternative embodiment of the present invention. In particular, a schematic block diagram of a handheld audio system 11 is presented that includes the functionality of handheld audio system 10 presented in a system on a chip configuration. In this embodiment, the functionality of radio signal decoder IC 12 and digital audio processing IC 14 are incorporated into a single integrated circuit, radio receiver IC 50. Radio receiver IC 50 is a system on a chip integrated circuit that includes an analog portion having a plurality of analog circuit modules and a digital portion that includes a plurality of digital circuit modules. In particular, radio receiver IC 50 includes radio stage 52, stereo decoder 54, processing module 56, and clock generator 101 that implements any or all of the features and functionality of other embodiments of the present invention described in conjunction with FIGS. 1-14.

In addition to the configurations shown in FIG. 2 and FIG. 3, other configurations that include one or more integrated circuits are likewise possible. The broad scope of the present invention includes other partitioning of the various elements of handheld audio system 11 into one or more integrated circuits.

Figure 4:
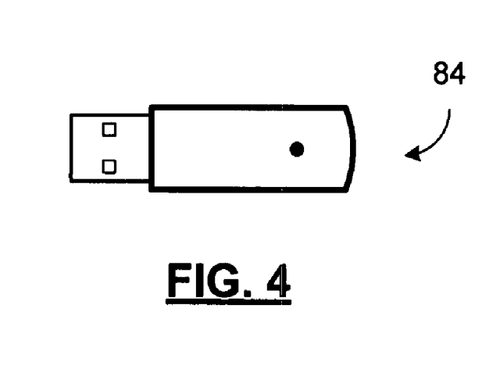
FIGS. 4-5 present pictorial diagrams of various devices in accordance with embodiments of the present invention.
Figure 5:
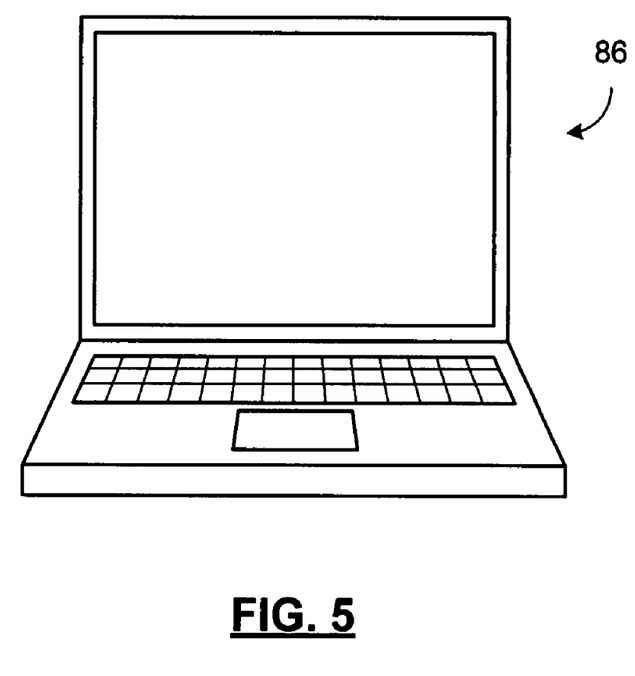

FIGS. 4-5 present pictorial diagrams of various devices in accordance with an embodiment of the present invention. While the preceding disclosure has been directed to a clock generator 101 used in conjunction with handheld audio systems 80, 10 and 11, in an embodiment of the present invention, clock generator 101 may be implemented by itself or part of other integrated circuits. While implemented as part of an integrated circuit or as part of a system on a chip integrated circuit, clock generator 101 can be used in a wide variety of electronic devices such as universal serial bus (USB) device 82, in computer 84, or in a variety of other electronic devices that employ clock signals and circuit modules that utilize clock signals.

Figure 6:
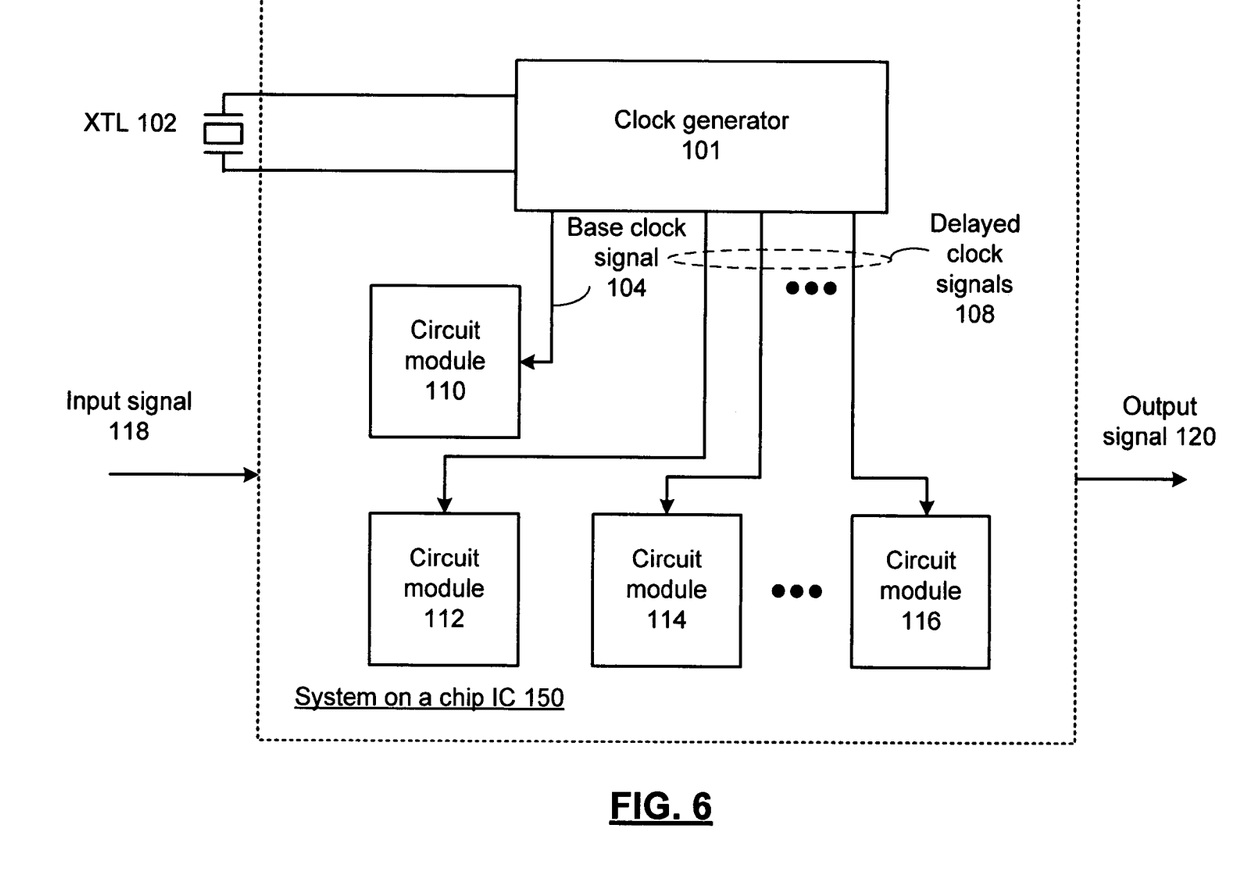
FIG. 6 presents a block diagram of a system on a chip integrated circuit in accordance with an embodiment of the present invention.

FIG. 6 presents a block diagram of a system on a chip integrated circuit in accordance with an embodiment of the present invention. In particular, system on a chip integrated circuit 150 includes circuit modules 110, 112, 114, and 116 that are operable to produce at least one output signal 120 based on at least one input signal 118. As discussed in conjunction with FIGS. 4-5, system on a chip integrated circuit 150 can implement any of a wide range of functions performed by electronic devices.

Clock generator 101 generates a base clock signal 104 for circuit module 110, based on a crystal 102. Clock generator 101 further generates delayed clock signals 108 for circuit modules 112, 114 and 116. In an embodiment of the present invention, The system on a chip integrated circuit 150 includes an analog portion and a digital portion wherein at least one of the circuit modules 110, 112, 114 and 116 includes a digital circuit and at least one of the circuit modules 110, 112, 114 and 116 includes an analog circuit.

Figure 7:
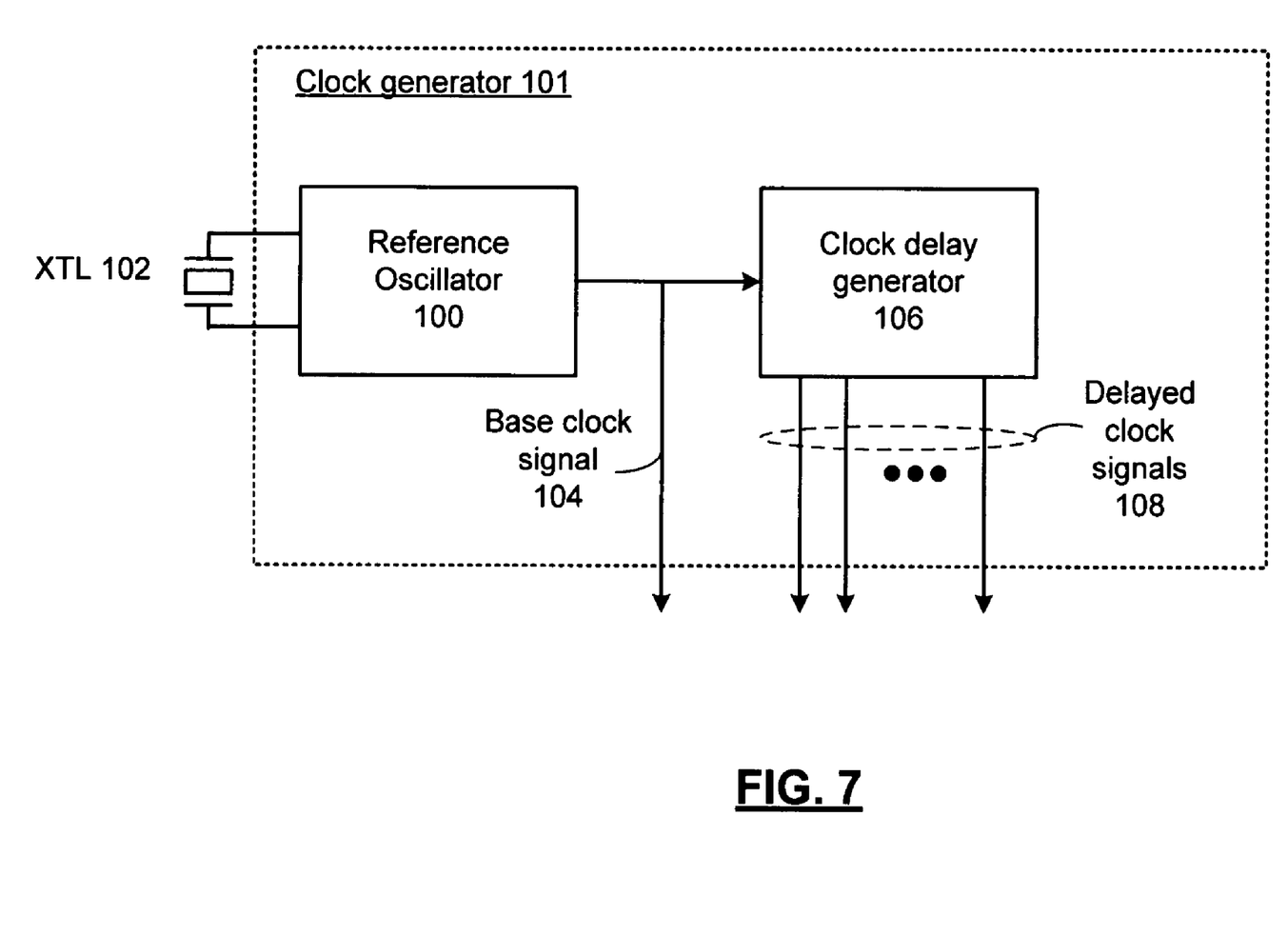
FIG. 7 presents a block diagram representation of a clock generator in accordance with an embodiment of the present invention.

FIG. 7 presents a block diagram representation of a clock generator in accordance with an embodiment of the present invention. In particular, clock generator 101 includes a reference oscillator 100, coupled to crystal 102, for generating base clock signal 104. Clock delay generator 106 is operably coupled to base clock signal 104 for generating delayed clock signals 108. Further details regarding possible implementations of clock delay generator 106 are provided in conjunction with FIGS. 8-10 that follow.

Figure 8:
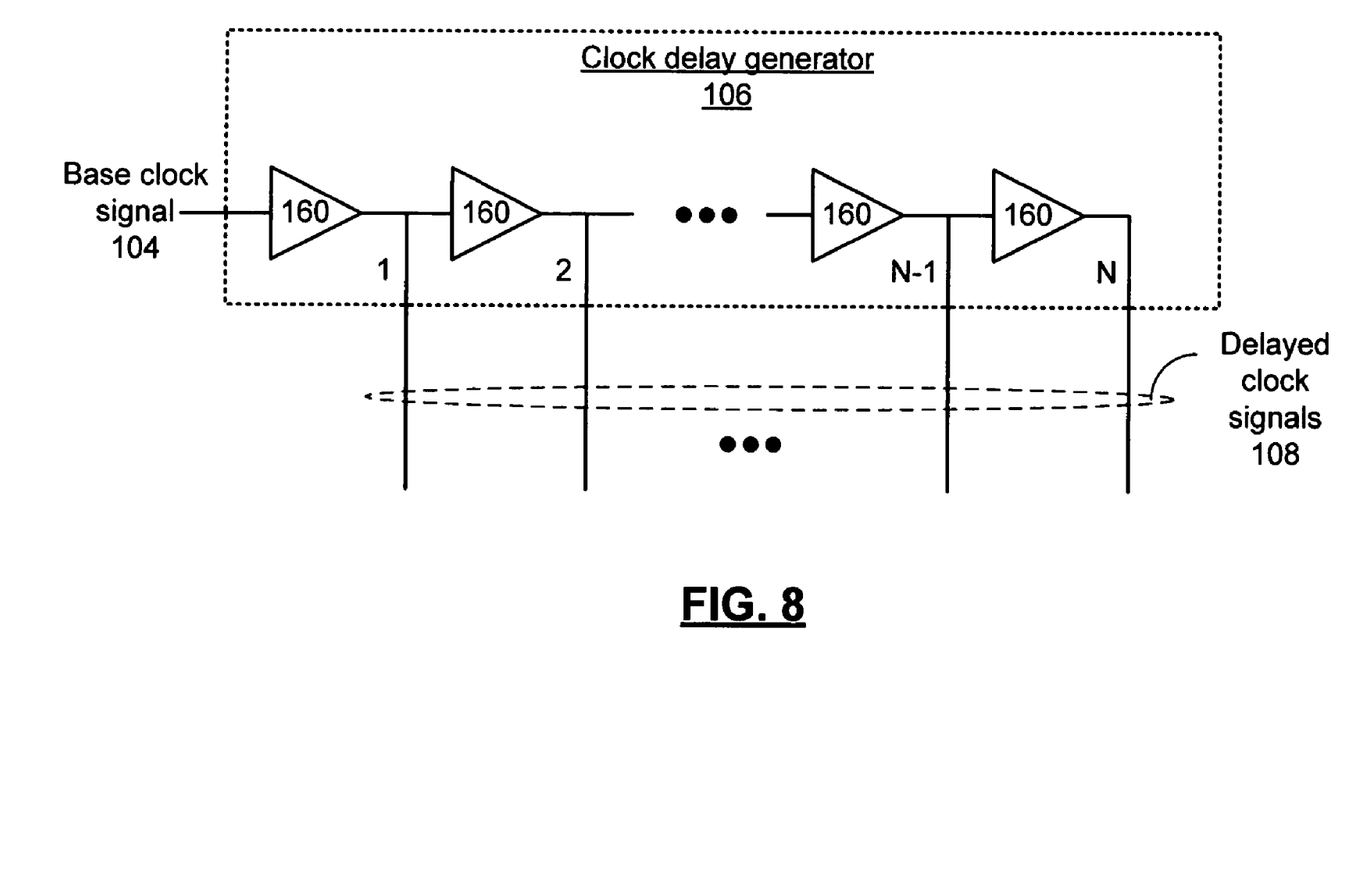
FIG. 8 presents a schematic/block diagram representation of a clock delay generator in accordance with an embodiment of the present invention.

FIG. 8 presents a schematic/block diagram representation of a clock delay generator in accordance with an embodiment of the present invention. In particular, clock delay generator 106 includes a plurality of buffers 160. Each buffer 160 has a corresponding time delay $d_i$, where $d_i$ represents the delay associated with the ith buffer 160. A first delayed clock signal will be delayed a clock delay amount $d_1$ from the base clock signal. A second delayed clock signal will be delayed a clock delay amount $d_1+d_2$ from the base clock signal. A Nth delayed clock signal will be delayed an amount from the base clock signal that can be represented as:

$$\text{Clock delay }(N) = \sum_{i=1}^{N} d_i$$

In an embodiment of the present invention, the delays associated with each of the buffers 160 are substantially equal. In this fashion, the N clock delays are uniformly spaced from the base clock signal.

In a further embodiment of the present invention, the each buffer 160 is implemented using different numbers of individual buffer circuits or the current to each buffer 160 is controlled to yield at least one delay $d_i$ that is substantially different from one or more of the other buffer delays. In this fashion, the N clock delays are non-uniformly spaced from the base clock signal. The use of non-uniform spacing has the effect of further spreading the noise spectrum generated by the noise transients of the clock signals that can be desirable in certain circuit implementations.

Figure 9:
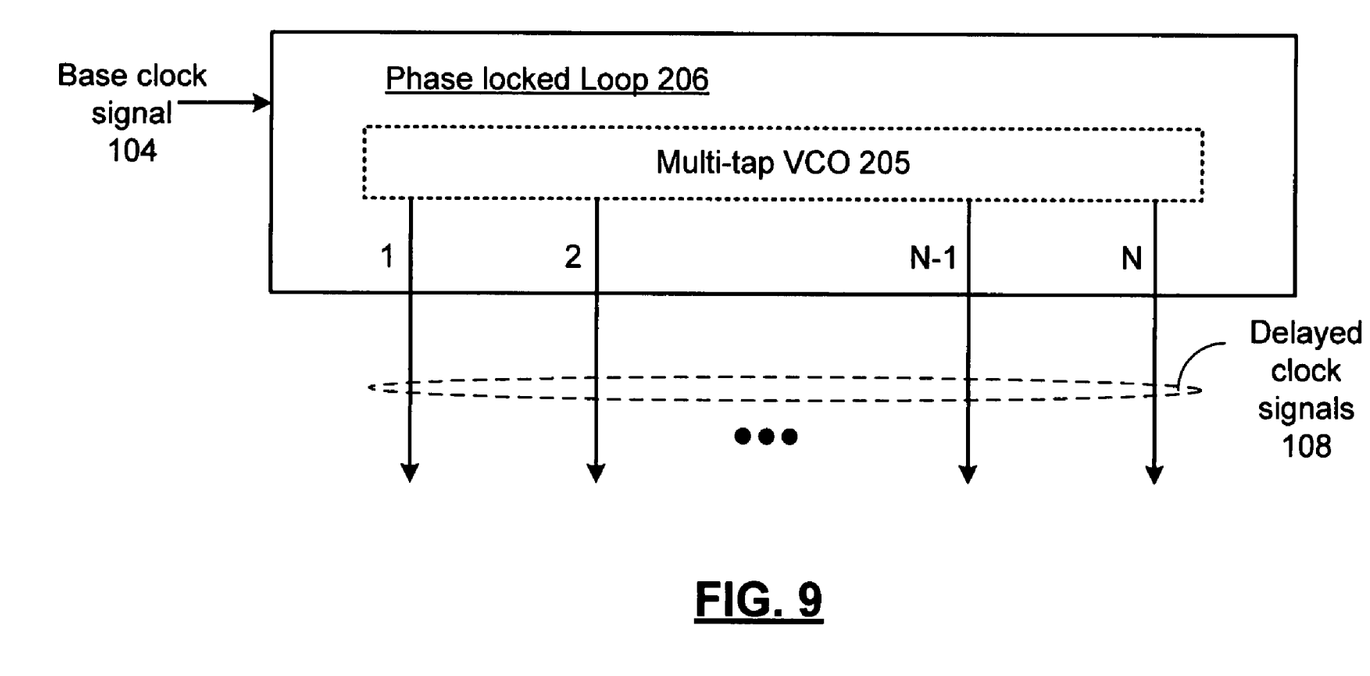
FIG. 9 presents a schematic/block diagram representation of a phase locked loop in accordance with an embodiment of the present invention.

FIG. 9 presents a schematic/block diagram representation of a phase locked loop in accordance with an embodiment of the present invention. In particular, clock delay generator 106 is implemented using phase locked loop 206 that generates delayed clock signals 108 based on base clock signal 104, using multi-tap voltage controlled oscillator (VCO) 205. In an embodiment of the present invention, multi-tap VCO 205 can be implemented with a multi-tap ring oscillator circuit. While two possible implementations of the clock delay generator 106 have been shown in conjunction with FIGS. 8 and 9, other implementations including tapped delay lines, transversal filters, switched capacitor circuits, charge coupled devices, bucket brigade circuits and other circuits and software implementations are likewise possible within the broad scope of the present invention.

Figure 10:
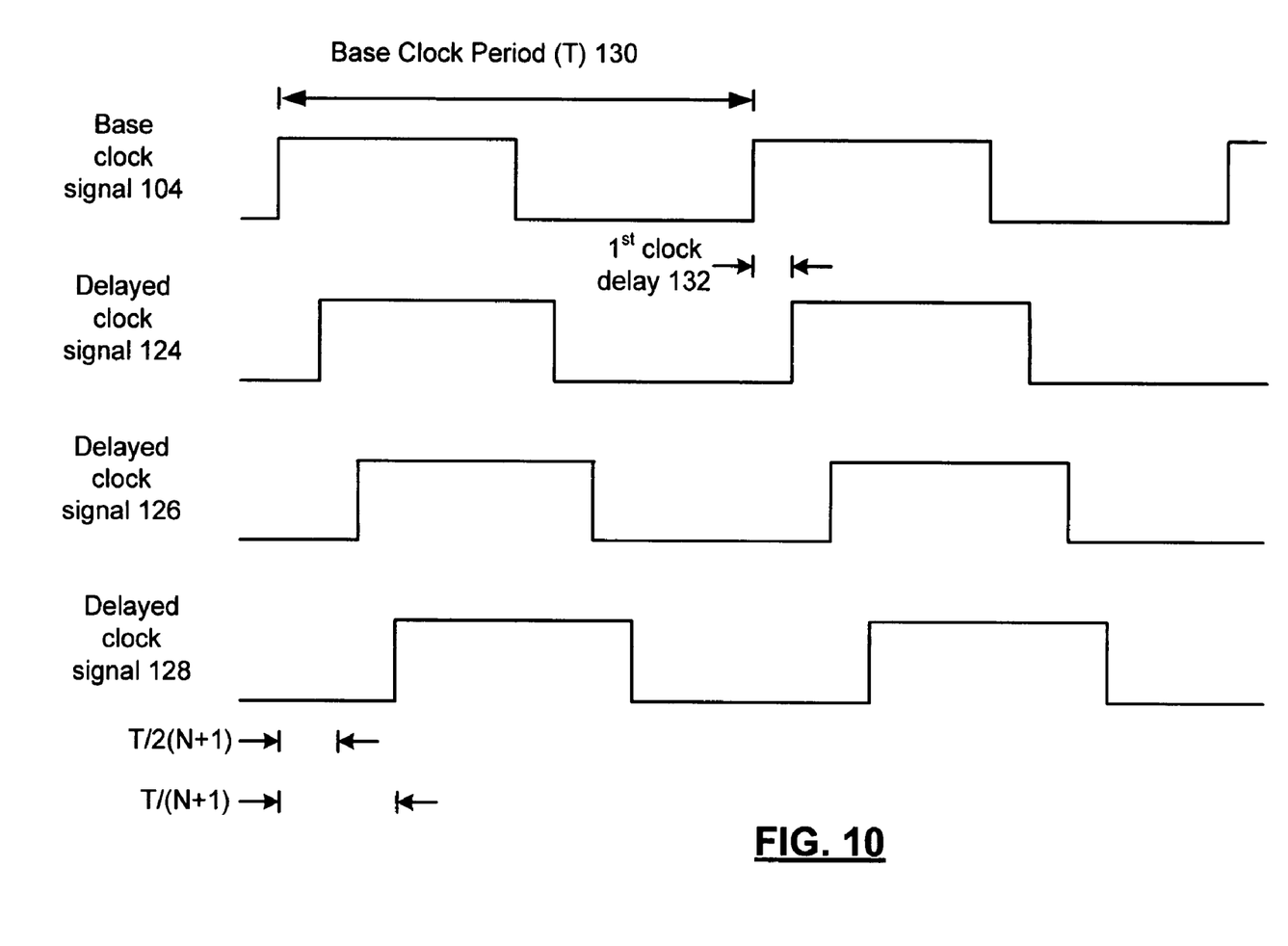
FIG. 10 presents a timing diagram in accordance with an embodiment of the present invention.

FIG. 10 presents a timing diagram in accordance with an embodiment of the present invention. In particular, an embodiment of the present invention is shown whereby N=3. Base clock signal has a base clock period 130 that can be represented by T. In accordance with this embodiment of the present invention, delayed clock signals 124, 126 and 128 are uniformly spaced from base clock signal 104. Further, while each of the clock delays are greater than zero, the delay times are small as compared with the base clock period T. In an embodiment of the present invention, at least one of the plurality of clock delays is less than T/(N+1). In a further embodiment of the present invention, at least one of the plurality of clock delays is less than T/2(N+1).

Figure 11:
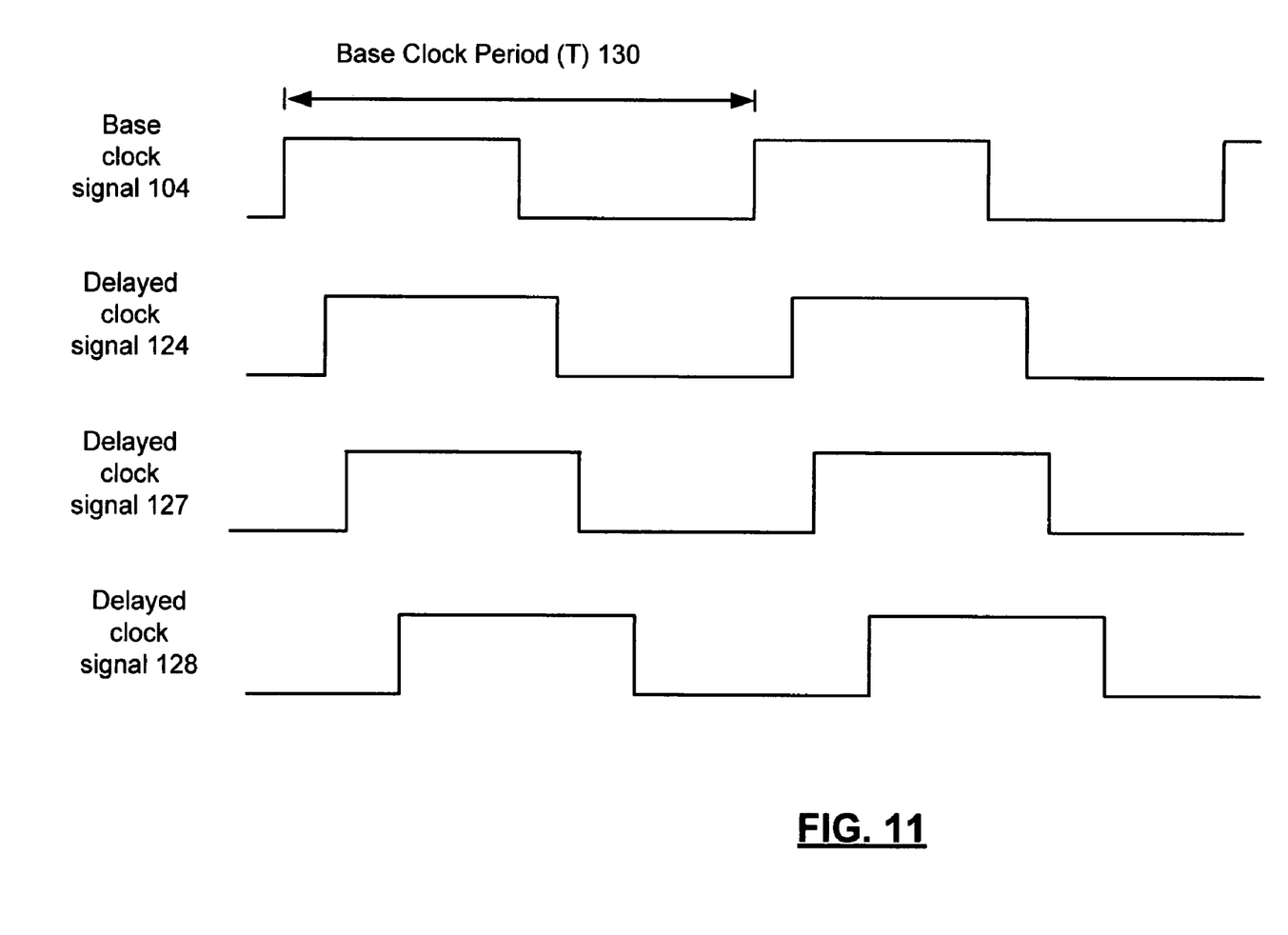
FIG. 11 presents a timing diagram in accordance with an embodiment of the present invention.

FIG. 11 presents a timing diagram in accordance with an embodiment of the present invention. In accordance with this embodiment of the present invention, N=3 and delayed clock signals 124, 127 and 128 are non-uniformly spaced from base clock signal 104. In particular, delayed clock signal 127 is advanced in time as compared with delayed clock signal 126, and therefore, is advanced in time from the uniform spacing presented in conjunction with FIG. 9.

While FIGS. 10 and 11 illustrate an embodiment of the present invention where N=3, far greater values of N can likewise be implemented. These greater values of N are particularly useful when clock delay generator 106 is implemented in complex system on a chip integrated circuits where many circuit modules are present. Further, while FIG. 11 illustrates a non-uniform spacing with a single delayed clock 127 that is displaced from uniform spacing, other non-uniform spacings including multiple displacements from uniform spacing or pseudo random spacing may likewise be implemented within the broad scope of the present invention.

Figure 12:
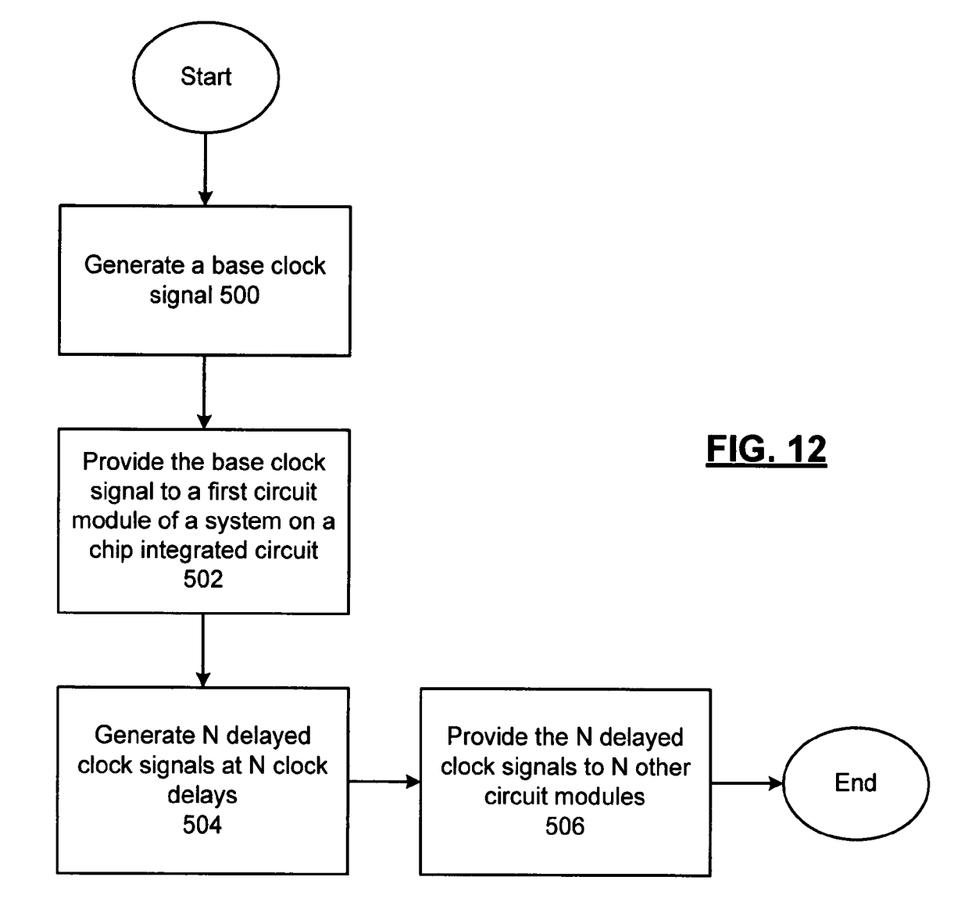
FIG. 12 presents a flowchart representation of a method in accordance with an embodiment of the present invention.

FIG. 12 presents a flowchart representation of a method in accordance with an embodiment of the present invention. In particular, a method is present for use in conjunction with the disclosures presented in association with FIGS. 1-11 and the other functions and features described therein. The method begins in step 500 by generating a base clock signal. In step 502, the base clock signal is provided to a first circuit module of a system on a chip integrated circuit. In step 504 N delayed clock signals at a corresponding N clock delays, are generated, wherein N is greater than or equal to 2. In step 506, the N delayed clock signals are provided to N corresponding other circuit modules of the system on a chip integrated circuit.

In preferred embodiments, the various circuit components are implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Thus, there has been described herein an apparatus and method, as well as several embodiments including a preferred embodiment, for implementing clock generator and system on a chip integrated circuit. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A clock generator for use in an integrated circuit, the clock generator comprising:
    a reference oscillator for generating a base clock signal at a base clock signal frequency; and
    a clock delay generator, operably coupled to the base clock signal, for generating N delayed clock signals at a corresponding N clock delays and at the base clock signal frequency, wherein N is greater than or equal to 2 and providing the N delayed clock signals to N circuit modules of the integrated circuit, wherein at least one of the N circuit modules includes a digital circuit and at least one of the N circuit modules includes an analog circuit;
    wherein T represents a base clock period and wherein at least one or the plurality of clock delays is less than $T/(N+1)$.

2. The clock generator of claim 1 wherein the clock delay generator includes a tapped delay line.

3. The clock generator of claim 1 wherein the clock delay generator includes a plurality of buffers.

4. The clock generator of claim 1 and wherein at least one of the plurality off clock delays is less than $T/2\ (N+1)$.

5. The clock generator of claim 1 wherein the N clock delays are uniformly spaced from the base clock signal.

6. The clock generator of claim 1 wherein the N clock delays are non-uniformly spaced from the base clock signal.

7. The clock generator of claim 1 wherein the clock delay generator includes a phased lock loop circuit.

8. The clock generator of claim 7 wherein the phase locked loop circuit includes a multi-tap voltage controlled oscillator.

9. The clock generator of claim 1 wherein at least one of the N delayed clock signals is supplied to an analog portion of the integrated circuit.

10. A method comprising:
    generating a base clock signal; and
    providing the base clock signal to a first circuit module of a system on a chip integrated circuit;
    generating N delayed clock signals at a corresponding N clock delays, wherein N is greater than or equal to 2;
    providing the N delayed clock signals to N corresponding other circuit modules of the system on a chip integrated circuit, wherein at least one of the other circuit modules includes an analog to digital converter, and wherein at least one of the other circuit modules includes a digital circuit and, at least one of the other circuit modules includes an analog circuit.

11. The method of claim 10 wherein T represents a base clock period, and wherein at least one of the plurality of clock delays is less than T/(N+1).

12. The method of claim 10 wherein T represents a base clock period, and wherein at least one of the plurality of clock delays is less than T/2(N+1).

13. The method of claim 10 wherein the N clock delays are uniformly spaced from the base clock signal.

14. The method of claim 10 wherein the N clock delays are non-uniformly spaced from the base clock signal.

15. A system on a chip integrated circuit including an analog portion and a digital portion, the system on an chip integrated circuit comprising:
- a reference oscillator for generating a base clock signal;
- a clock delay generator, operably coupled to the base clock signal, for generating N delayed clock signals at a corresponding N clock delays, wherein N is greater than or equal to 2;
- a first circuit module operably coupled to the base clock signal; and
- N other circuit modules, each of the N other circuit modules operably coupled to a corresponding delayed clock signal of the N delayed clock signals, the N other circuit modules includes an analog to digital converter module, and wherein at least one of the N other circuit modules includes a digital circuit and at least one of the N other circuit modules includes an analog circuit;
- wherein the first circuit module and the N other circuit modules are operable to produce at least one output signal based on at least one input signal.

16. The system on a chip integrated circuit of claim 15 wherein the clock delay generator includes a tapped delay line.

17. The system on a chip integrated circuit of claim 15 wherein the clock delay generator includes a plurality of buffers.

18. The system on a chip integrated circuit of claim 15 wherein T represents a base clock period, and wherein at least one of the plurality of clock delays is less than T/(N+1).

19. The system on a chip integrated circuit of claim 15 wherein T represents a base clock period, and wherein at least one of the plurality of clock delays is less than T/2(N+1).

20. The system on a chip integrated circuit of claim 15 wherein the N clock delays are uniformly spaced from the base clock signal.

21. The system on a chip integrated circuit of claim 15 wherein the N clock delays are non-uniformly spaced from the base clock signal.

22. The clock generator of claim 15 wherein the clock delay generator includes a phased lock loop circuit.

23. The clock generator of claim 22 wherein the phase locked loop circuit includes a multi-tap voltage controlled oscillator.

* * * * *